May 12, 1970   J. CHMIEL   3,511,963
LIQUID COOLED CONTACT POINT OF A SPOT WELDER
Filed Nov. 16, 1967   4 Sheets-Sheet 4

United States Patent Office 3,511,963
Patented May 12, 1970

3,511,963
LIQUID COOLED CONTACT POINT OF A SPOT WELDER
Jan Chmiel, Ul. Sienkiewicza 9/8 Krakow, Poland
Filed Nov. 16, 1967, Ser. No. 683,566
Claims priority, application Poland, Nov. 21, 1966,
P 117,490; Dec. 12, 1966, P 117,928
Int. Cl. B23k 9/24
U.S. Cl. 219—120          5 Claims

ABSTRACT OF THE DISCLOSURE

An electrode holder for holding and cooling a small solid electrode, provided with helical fluid conducting passages extending from remotely of the forward end to the forward end and thence back: the passages are formed by grooves in a holder body, having either a fluid retaining sleeve thereon or a pipe therein.

---

Figure 1:
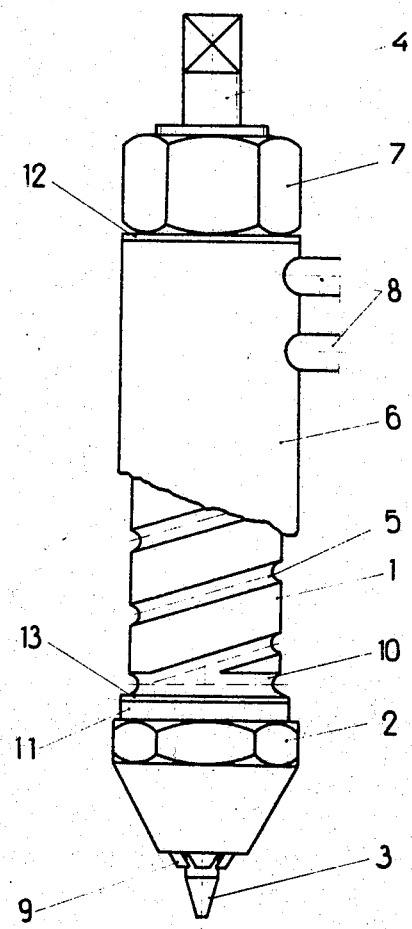

The range of uses of the electrode holder of the present invention is unusually wide: it may be used for joining of such workpieces as fuse-link caps, electrodes, grids, screens and glowing filaments of electronic tubes, picture tubes or incandescent lamps, as well as in almost all branches of the precision parts industry, as for example the manufacturing of watches, electric measuring instruments, measuring-controlling instruments, wireless and television apparatus, medical apparatus, subassemblies and devices for the teletechnics, in the optical photographic, fancy goods and toy industries, and wherever metallic workpieces having small dimensions of the welded surfaces are to be joined, and if there is restricted access to the welded pieces.

All the mentioned uses of the electrode holder according to the invention show only a part of the advantages which are provided by the present invention electrode, which in its scope realises the principle of the interchangeability of the operating member of a tool in relation to its holder, known and commonly applied for tools of other kinds. It provides also, in a suitable manner, liiquid-cooling by the way of transferring heat to the coolant, with the ability to control the intensity of cooling. The advantages mentioned above make it easy to perform a range of technological operations, and achieves the reduction of welding costs.

There are known electrodes, used in welding processes and in the process of spot welding, which have a monolitic structure, i.e. they are made of homogenous material. In the case of complete consumption of such an electrode it is replaced by a new one. Consequently, that part of the electrode which is used for chucking it in the holder of the welder cannot be further used and so is waste material. There are also known electrodes with a working point pressed into a hole of the holder body, which is substantially made from a hard and wear resistant material—as for example tungsten or the like. There are also known electrodes with a working point connected with the body by means of a threaded joint. These are very expensive and the production of them is very time consuming. The disadvantage of such electrodes consists in that the operating points frequently are loosened during use, as a result of the effect of thermal expansion, which is different for various materials.

During use, as a result of the wearing of the operating point, these electrodes are required to be re-ground in order to give them the necessary shape and to provide a new operating point. As a result of this operation there occurs a remarkable wearing of the material of the body of the electrode, which usually is made from copper, as well as of the operating point which frequently is made from tungsten. This causes notable material losses and so increases the expenses of the welding process.

Frequently for welding workpiece of different dimensions it is necessary to use operating points having suitable dimensions and made from suitable materials. In order to insure that, the diameter of the operating point is suited to the dimensions of joined pieces, until the desired dimensions are obtained. The operation of grinding the contact point is time consuming and expensive, since the contact points are usually made from tungsten, and in the course of the grinding a great quantity of materials, from which the contact point and the electrode body are made, are worn. Moreover, there always remains in the electrode body a non-used part of the operating point, which cannot be further ground because of loss of strength. An additional factor rendering it difficult to use conventional electrodes is the necessity of providing the necessary number of electrodes with regard to the dimensions of the operating points and materials from which they are made.

There is also known an electrode holder with an interchangeable operating point—as for example according to the Polish Pat. No. 52,351—intended for spot welding fine workpieces. It is characterized by a very fine and precise structure and it is suitable only for welding workpieces of rather small dimensions and under low static or dynamic loadings, and considering that it is not cooled it is resistant only to low thermic loading, which makes it necessary to stop the welding process in order to cool the electrode.

The structure of the electrode holder according to Polish Pat. No. 52,351 permits the interchange of the operating point and the adjustment of the magnitude of the protrusion of this point, but the range of application of the electrode holder is limited owing to considerable quantity of heat arising during the welding, which disadvantageously influences the condition of fine component parts of the electrode holder. This phenomenon limits the range of application of the electrode holder according to Polish Pat. No. 52,351 only to the welding of small fine workpieces, where only a small quantity of heat arises, causing a low thermic loading.

Using known and commonly applied means for cooling the electrode is not possible because of substantial structural differences between these electrodes and of the electrode for spot welding of fine workpieces according to Polish Pat. No. 52,351. The known structures of liquid-cooled electrodes have holes in the body of the electrode parallel to its axis and passing through this body and connected near the operating point so that they form a duct through which the cooling liquid flows.

The substantial disadvantages of such a cooling system consist in an unsufficient cooling of the electrode affected by the relatively small heat exchanging surfaces and by the nonuniform temperature distribution in the volume of the body of the electrode. In the case of the electrode holder according to the Polish Pat. No. 52,351 such a system of cooling may not be applied considering the structure of the electrode.

An electrode holder according to the present invention, liquid-cooled and permitting easy interchange the operating point, is free from the disadvantages noted above.

The essential feature of the holder electrode according to the invention is the very advantageous and novel cooling system which secures a uniform cooling of the entire electrode and eliminates all the accidental phenomena occurring in cooling systems applied herebefore, wherein the turbulent flow of the cooling agent disadvantageously affects the cooling performance.

In consideration of the structure of the electrode, a new cooling system is applied, wherein the coolant cools the body of the electrode without coming into a direct contact with the operating point and other members used for controlling or chucking the electrode. In this way these members are protected from the corrosive action of the coolant, and also the possibility of the coolant contacting the welded pieces is eliminated.

Figure 2:
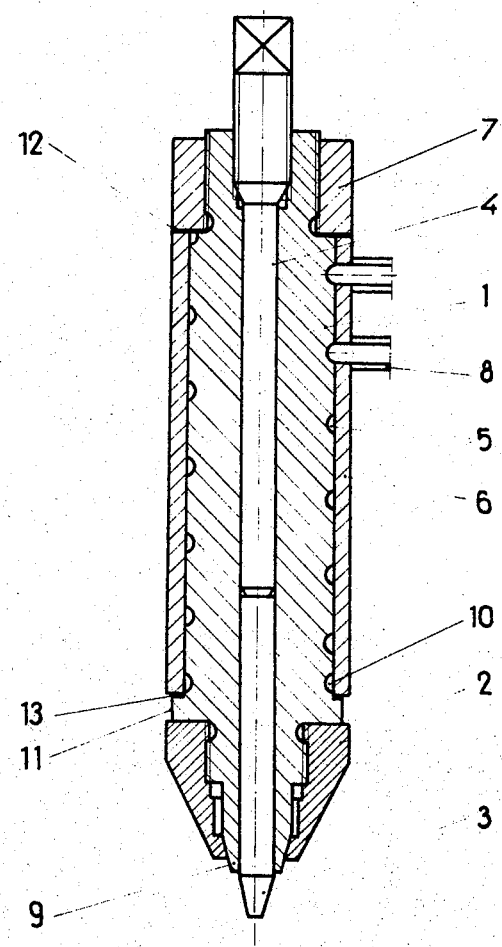
Figure 3:
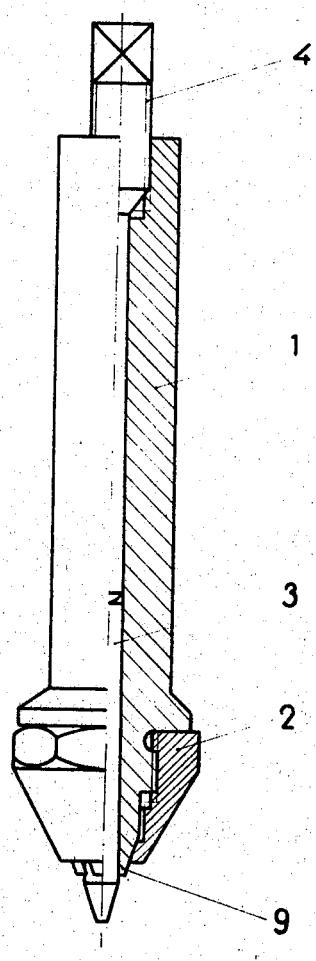
Figure 4:
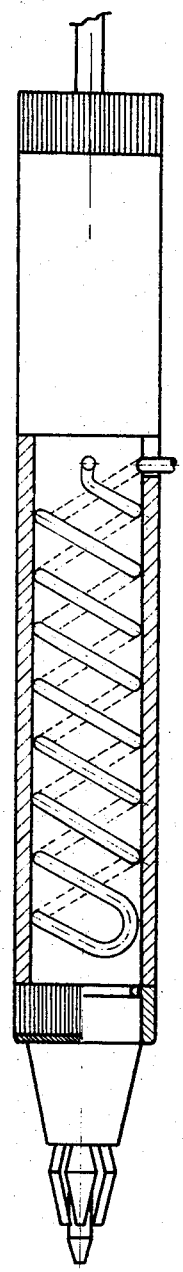

The structure of the electrode holder according to the invention is shown by way of example in the accompanying drawing where FIG. 1—shows the electrode holder according to the invention partially broken away; FIG. 2 is a longitudinal section of the electrode holder; FIG. 3 is an elevation with parts in section of an electrode holder without liquid cooling; and FIG. 4 shows the electrode holder with a pipe placed in a groove made in the body.

The electrode holder according to the invention comprises an elongate body 1 provided at one end with clamping jaws 9, for chucking the electrode 3, which at its upper end abuts against the front surface of a control stem 4. The clamping jaws 9 are closed together by screwing on a lower external thread the clamping nut 2. In the upper part of the body there is a threaded part of the axially extending bore hole of the body 1 in which the control stem 4 is screwed.

On the external surface of the body 1 there is provided a double helical groove 5 of a profile of a semi-circle, a rectangle, a trapezium or a triangle. Both coils of the winding of the helical groove 5 are connected through a ring groove 10, made preferably near to the flange 11, and form thus a closed circuit. Upon the body 1 of the electrode holder there is driven a sleeve 6 which covers the double helical groove 5 and contacts the body 1 between the groove 5, forming thus a cooling circulation duct. The sleeve 6 abuts against the flange 11 and it is clamped by means of the nut 7. In order to secure fluid tightness of the cooling circuit, sealing washers 12 and 13 may be used, made from soft copper, vulcanized fibre, asbestos or other material. In the upper part of the sleeve 6 near the nut 7 there are provided pipes 8 through which the coolant flows in and out. The pipes are fixed to the sleeve 6 in such a way that their openings are aligned with the start points of both coils of the helical groove 5. The cooling performance may be controlled by an increase or reduction of the number of turns of the cooling duct, of its cross-sectional surface, of the cross-sectional surface of the ring groove 10, which cross-sectional surface may be up to five times larger than that of the helical groove 5, and most important by controlling the flow rate of the cooling medium.

The cooling may be performed by using different liquid mediums, and so not only water, but also other fluids such as liquid nitrogen, oil, etc., or solutions as e.g. the water solution of white salt.

According to thorough calculations being carried out for the example of using water as the medium for cooling the electrode it is sufficient to feed water from the water-pipe network, under a pressure not lower than 0.5 atm. The electrode holder may be tapered to permit its use in jaw welders. It may be also executed as a non-cooled tool, as it is shown in FIG. 3.

The electrode holder for spot welding fine workpieces may be realized by placing in the double start helical groove a thin-walled pipe, which is driven in, and through which the coolant flows. Such arrangement is used when it is desired to reduce as far as possible the diameter of the electrode and where cooling is necessary.

The use of the electrode holder according to the specified invention is easy and simple. By tightening the clamp nut 2 the operating point 3 may be chucked loosely in the jaws, and then, by revolving the controlling stem 4 the magnitude of the protrusion of the operating point 3 is fixed. After this, the clamping nut 2 may be firmly tightened. The electrode holder prepared in this way is ready for operation. After partial wearing of the operating point 3 the clamp nut 2 should be a little loosened and the jaws unclamped and through revolving the control stem 4 the operating point may be extended the desired length. In such way the best use of the operating point is achieved without wearing the body of the electrode. The electrode may be used many times, and according to needs the operating points 3 of different shapes and made from different materials may be used.

The operating point of the electrode holder is designed as an interchangable element, moreover, the structure of the electrode holder permits the use of very expensive tungsten in a most economical manner. The holder of the electrode is constructed in such way, that it makes possible not only quick exchange of used tungsten operating point but also the use of an operating point of other kind in the same holder. For example the holder makes it possible to use operating points of different diameters or profiles, suitable to the shape and dimensions of the workpiece. The electrode holder according to the invention is thereby a multi-purpose holder, which considerably lowers the expense of building and using the welding apparatus.

The shape of the operating point, and especially of its tip may be chosen suitably for the use intended (a taper of an angle of 150–160°, a frustum of cone of an angle of 60° to 105°, ball point of a radius of 10 to 50 mm. or more, etc). Also the diameter of the point may be an arbitrary one within certain limits, (a too large is not recommended as the cooling effect decreases considerably with increase of the diameter of the point).

The electrode holder is provided, of course, not only for tungsten or copper operating point, but also for points made from other materials chosen according to the conditions of welding. The structure of the electrode holder specified above admits to as best as possible use of the material of the operating point of the electrode, what has hitherto no been achieved in the practice of welding.

The electrode holder according to the invention achieves the welding of different materials and does not need to be exchanged as a whole, but only the operating point needs to be replaced. A single invention electrode holder equipped with a set of operating points of different forms and made from different materials makes it possible to perform any spot welding operation. The structure of the electrode holder specified above makes possible the replacing of the operating point and of the controlling of the protrusion of this operating point, with simultaneous cooling it by a liquid at controlled intensity, which thereby reduces the temperature of the electrode and avoids the deleterious effects of overheating. The present electrode holder is a multi-purpose structure of a very wide range of application, especially in those branches of technology where spot welding was hitherto not used owing to deficiency of suitable tools.

What is claimed is:
1. An electrode holder assembly comprising:
an elongate holder body having an axially extending bore therethrough,
chuck means at one end of said body for releasably holding an electrode positioned in said bore,
and means for cooling said holder body and an electrode held therein comprising inlet and outlet port means located adjacent the end of said holder body opposite said one end thereof, and fluid passage means fluid connecting said port means and extending helically about said holder body from said inlet port to adjacent said one end thereof, and helically from adjacent said one end to said outlet port.

2. The structure of claim 1, said fluid passage means comprising a double helical groove.

3. The structure of claim 2, said helical groove being in the exterior surface of said holder body, and sleeve means on said holder body in engagement with the surface thereof between said groove.

4. The structure of claim 1, and pipe means in said groove, said pipe means being fluid connected to said port means.

5. The structure of claim 1, and further including adjustable means for positioning an electrode axially along said bore.

References Cited

UNITED STATES PATENTS

| 1,618,383 | 2/1927 | Lloyd | 219—120 |
| 2,392,736 | 1/1946 | Hensel et al. | 219—120 |
| 2,980,790 | 4/1961 | Bracken | 219—120 |
| 3,215,811 | 11/1965 | Kroy et al. | 219—120 |

JOSEPH V. TRUHE, Primary Examiner

L. A. ROUSE, Assistant Examiner